(12) United States Patent
Huang (10) Patent No.: US 10,650,494 B2
(45) Date of Patent: May 12, 2020

(54) IMAGE STITCHING METHOD AND DEVICE (71) Applicant: MStar Semiconductor, Inc., Hsinchu Hsien (TW)

(72) Inventor: Ren-You Huang, Hsinchu Hsien (TW)

(73) Assignee: XIAMEN SIGMASTAR TECHNOLOGY LTD, Shamen, Fujian (CN)

( * ) Notice: Subject to any disclaimer, the term of this patent is extended or adjusted under 35 U.S.C. 154(b) by 54 days.

(21) Appl. No.: 16/056,747

(22) Filed: Aug. 7, 2018

(65) Prior Publication Data

US 2019/0197665 A1    Jun. 27, 2019

(30) Foreign Application Priority Data

Dec. 27, 2017 (TW) .............................. 106146009 A (51) Int. Cl.
*G06T 3/40* (2006.01)
*G06T 7/55* (2017.01)
*G06T 7/30* (2017.01)
*G06T 7/73* (2017.01)

(52) U.S. Cl.
CPC .............. *G06T 3/4038* (2013.01); *G06T 7/30* (2017.01); *G06T 7/55* (2017.01); *G06T 7/73* (2017.01); *G06T 2207/20212* (2013.01)

(58) Field of Classification Search
CPC ................................................. G06T 3/4038; G06T 7/73; G06T 7/30; G06T 7/55; G06T 2207/20212
USPC ........................................................ 382/291
See application file for complete search history.

(56) References Cited

U.S. PATENT DOCUMENTS

| 2008/0170803 A1* | 7/2008 | Forutanpour ......... G06T 3/4038 382/284 |
| 2010/0014780 A1* | 1/2010 | Kalayeh ................... G06T 1/00 382/284 |
| 2014/0314325 A1* | 10/2014 | Muninder ............. G06T 3/4038 382/199 |
| 2015/0172620 A1* | 6/2015 | Guo ........................ G06T 11/60 348/659 |
| 2017/0006220 A1* | 1/2017 | Adsumilli .......... H04N 5/23238 |
| 2017/0287184 A1 | 10/2017 | Pettersson |
| 2019/0082103 A1* | 3/2019 | Banerjee ............ H04N 5/23229 |
| 2019/0108615 A1* | 4/2019 | Bartels .................. G06T 3/4038 |

* cited by examiner

*Primary Examiner* — Juan A Torres
(74) *Attorney, Agent, or Firm* — Edell, Shapiro & Finnan, LLC (57) ABSTRACT

An image stitching method and an image stitching device for stitching a first image and a second image are presented. The image stitching method includes: calculating, according to pixel values of the first image and the second image in an overlapping area, a plurality of costs respectively corresponding to a plurality of positions in the overlapping area; calculating, according to the plurality of costs and relative distances between the plurality of positions, a plurality of forward regularized cumulative costs respectively corresponding to the plurality of positions in the overlapping area; determining a seam in the overlapping area according to the plurality of forward regularized cumulative costs, wherein the seam includes a plurality of stitching positions; and stitching the first image and the second image on the basis of the seam to generate a stitched image.

14 Claims, 13 Drawing Sheets

|   | 1 | 2 | 3 | 4 | 5 | 6 | 7 | 8 | 9 | 10 |
|---|---|---|---|---|---|---|---|---|---|---|
| 1 | 10000 | 0 | 29929 | 65025 | 65025 | 65025 | 65025 | 65025 | 29929 | 10000 |
| 2 | 65025 | 0 | 0 | 29929 | 65025 | 65025 | 65025 | 65025 | 29929 | 65025 |
| 3 | 65025 | 29929 | 0 | 0 | 0 | 0 | 0 | 0 | 0 | 65025 |
| 4 | 65025 | 65025 | 65025 | 0 | 65025 | 65025 | 65025 | 29929 | 0 | 65025 |
| 5 | 10000 | 29929 | 65025 | 65025 | 65025 | 29929 | 26896 | 65025 | 0 | 65025 |
| 6 | 65025 | 65025 | 65025 | 33124 | 29929 | 65025 | 65025 | 61504 | 0 | 65025 |
| 7 | 29929 | 65025 | 65025 | 65025 | 65025 | 0 | 0 | 0 | 0 | 33124 |
| 8 | 65025 | 0 | 0 | 65025 | 65025 | 65025 | 29929 | 65025 | 65025 | 29929 |
| 9 | 33124 | 0 | 29929 | 65025 | 65025 | 65025 | 65025 | 65025 | 65025 | 65025 |
| 10 | 0 | 29929 | 65025 | 65025 | 65025 | 65025 | 65025 | 65025 | 65025 | 29929 |

IMAGE STITCHING METHOD AND DEVICE

This application claims the benefit of Taiwan application Serial No. 106146009, filed on Dec. 27, 2017, the subject matter of which is incorporated herein by reference.

BACKGROUND OF THE INVENTION

Field of the Invention

The invention relates in to image processing, and more particularly to image stitching.

Description of the Related Art

Image stitching technologies are applied to combine two images to obtain a larger image. When the same object in two images is shot by a moving camera, parallax of the object exists between the two images due to different shooting distances. Further, when the same object in two images is shot by two different lenses, e.g., fish-eye lenses, distortion levels of the object in the two images are different.

When parallax or different distortion levels of the same object exist in two images, a seam in a conventional image stitching technology passes through the object, such that the object in a stitched image becomes misaligned and the quality of the stitched image is lowered. Therefore, there is a need for an improved image stitching technology for resolving the issues of the prior art.

SUMMARY OF THE INVENTION

In view of the issues of the prior art, it is an object of the present invention to provide an image stitching method and device for enhancing the quality of a stitched image.

The present invention discloses an image stitching method for stitching a first image and a second image. The method includes: calculating, according to pixel values of the first image and the second image in an overlapping area, a plurality of costs respectively corresponding to a plurality of positions in the overlapping area; calculating, according to the plurality of costs and relative distances between the plurality of positions, a plurality of forward regularized cumulative costs respectively corresponding to the plurality of positions in the overlapping area; determining a seam in the overlapping area according to the plurality of forward regularized cumulative costs, wherein the seam includes a plurality of stitching positions; and stitching the first image and the second image on the basis of the stitching line to generate a stitched image.

The present invention further discloses an image stitching device for stitching a first image and a second image. The device includes a cost calculating unit, a forward regularized cumulative cost calculating unit, a seam determining unit and a stitching unit. The cost calculating unit calculates, according to pixel values of the first image and the second image in an overlapping area, a plurality of costs respectively corresponding to a plurality of positions in the overlapping area. The cumulative cost calculating unit calculates, according to the plurality of costs and the plurality of positions, a plurality of forward regularized cumulative costs respectively corresponding to the plurality of positions in the overlapping area. The seam determining unit determines a seam in the overlapping area according to the plurality of forward regularized cumulative costs. The stitching unit stitches the first image and the second image on the basis of the seam to generate a stitched image.

The above and other aspects of the invention will become better understood with regard to the following detailed description of the non-limiting embodiments. The following description is made with reference to the accompanying drawings.

DETAILED DESCRIPTION OF THE INVENTION

The image stitching method of the present invention may be performed by an image stitching device of the present invention or by an equivalent device. In one embodiment, the image stitching device may consist of a computing circuit capable of executing programs (e.g., a central processing unit, a microprocessor, a microcontroller, or a digital signal processor) and a memory. The memory stores a plurality of program codes or program instructions. The computing circuit implements the image stitching method of the present invention by executing the program codes or instructions.

Figure 1:
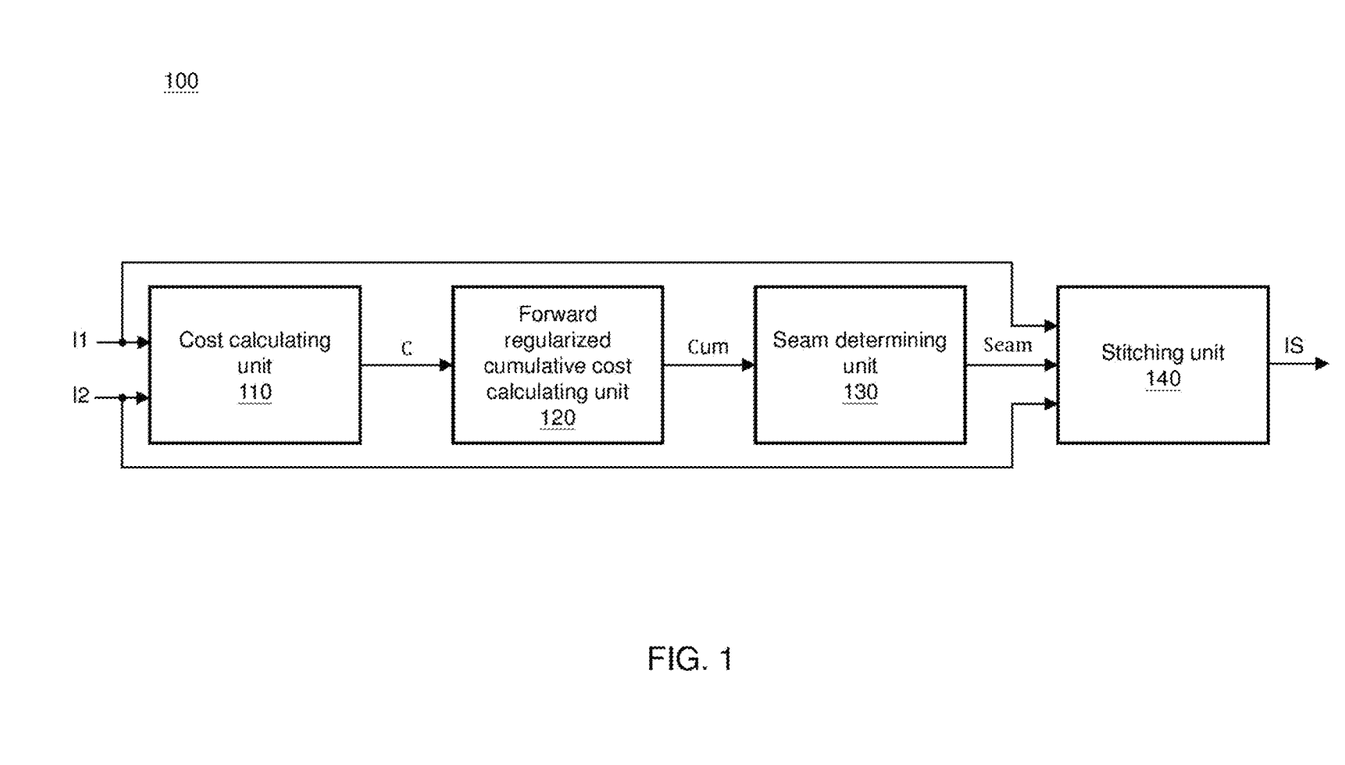
FIG. 1 is a function block diagram of an image stitching device according to an embodiment of the present invention.
Figure 3:
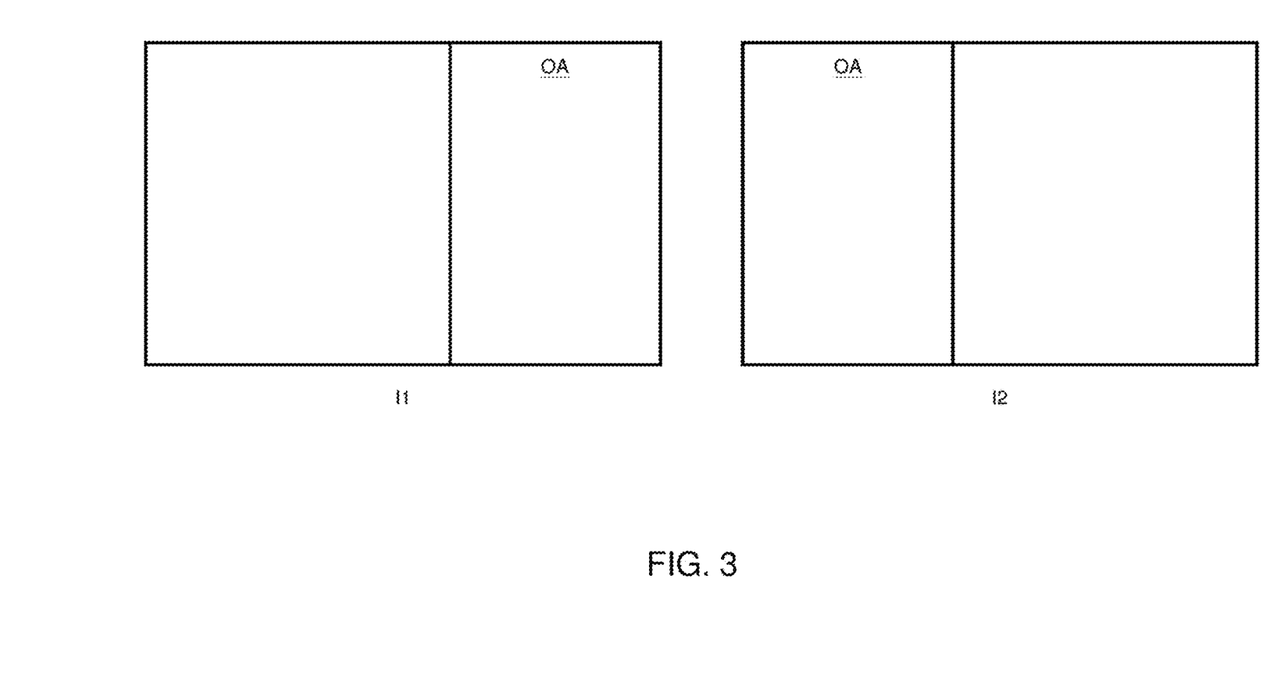
FIG. 3 is a schematic diagram of an overlapping area OA.
Figure 4:
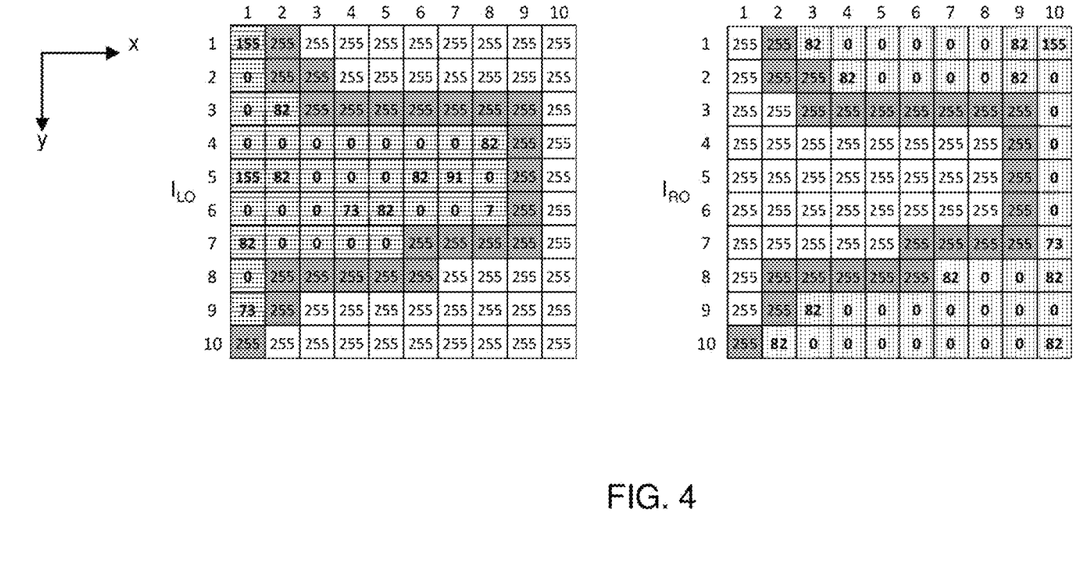
FIG. 4 is an example of pixel values of a first image and a second image in an overlapping area.

FIG. 1 shows a function block diagram of an image stitching device according to an embodiment of the present invention. The image processing device 100 includes a cost calculating unit 110, a forward regularized cumulative cost calculating unit 120, a seam determining unit 130 and a stitching unit 140. The image stitching device 100 is used to stitch an overlapping area OA of a first image I1 and a second image I2. For example, the overlapping area OA may be a left-right overlapping area (as shown, e.g., in FIG. 3); in another embodiment, the overlapping area OA may be a top-bottom overlapping area. FIG. 4 shows an example of pixel values of the first image I1 and the second image I2 in an overlapping area OA. In this example, the overlapping area includes 10*10 pixels, which, for example but not limited to, are each 8-bit and correspond to grayscales. In another embodiment, the overlapping area may include 10*1080 pixels, which may each be 10-bit and correspond to one of the channels of a color space, e.g., R, G, B, Y, U or V. As shown in FIG. 4, in the overlapping area OA, the first image I1 includes a first object (parts shaded by horizontal lines) and the background (parts in a pixel value of 255), and the second image I2 includes a second object (parts shade by vertical lines) and the background (parts in a pixel value of 255). Ideally, better stitching image quality can be obtained if a seam does not pass through an object; for example, the pixels of the background in gray are used as a seam.

Figure 2:
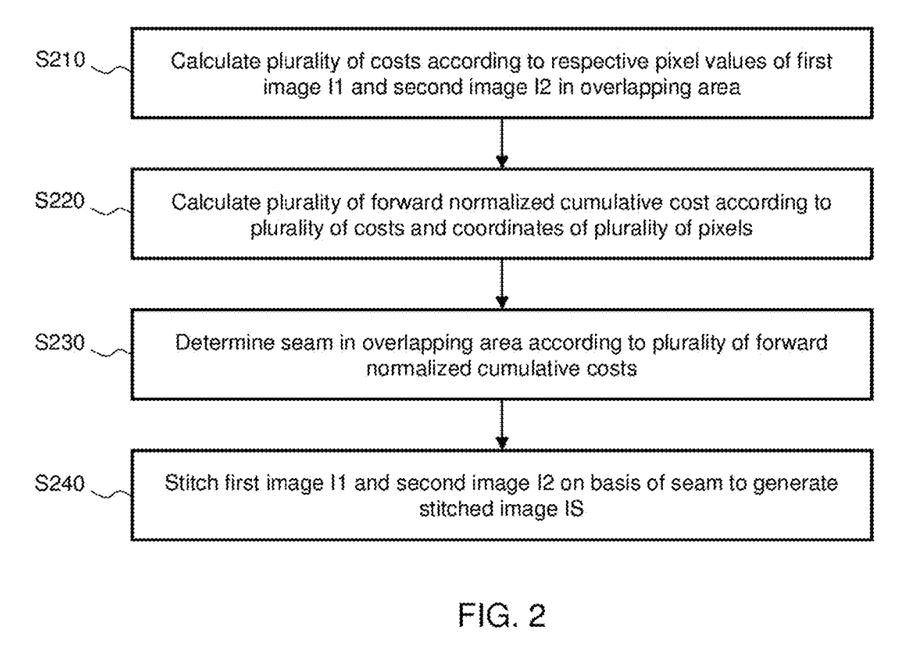
FIG. 2 is a flowchart of an image stitching method according to an embodiment of the present invention.

FIG. 2 shows a flowchart of an image stitching method according to an embodiment of the present invention. Referring to FIG. 1 and FIG. 2, the cost calculating unit 110 first calculates, according to pixel values $I_{LO}$ of the first image I1 in the overlapping area OA and pixel values $I_{RO}$ of the second image I2 in the overlapping area OA, a plurality of costs C (step S210). In an embodiment, the cost calculating unit 110 may calculate the plurality of costs C according to equation (1) below:

$$C(x,y)=\Sigma(I_{LO}(x,y)-I_{RO}(x,y))^2 \quad (1)$$

Figure 5:
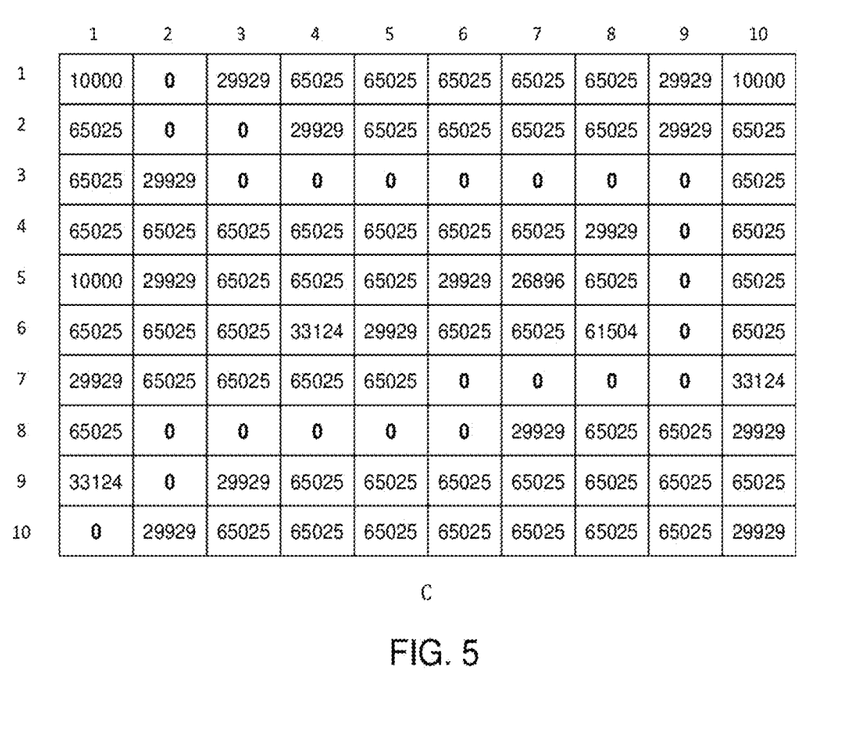
FIG. 5 show a plurality of costs C.

In equation (1), C(x, y) is a cost corresponding to a position P=(x, y) in the overlapping area OA, $I_{LO}(x, y)$ is a pixel value of the first image I1 corresponding to the position P=(x, y) in the overlapping area OA, and $I_{RO}(x, y)$ is a pixel value of the second image I2 corresponding to the position P=(x, y) in the overlapping area OA. Taking the overlapping area in FIG. 4 for instance, $C(1,1)=(155-255)^2=10000$, $C(1,2)=(255-255)^2=0$, $C(1,3)=(255-82)^2=29929$, and so forth. As shown in FIG. 5, the cost calculating unit 110 accordingly generates the plurality of costs C respectively corresponding to a plurality of positions P(x, y) in the overlapping area OA, where 1≤x≤10, and 1≤y≤10.

The cumulative cost calculating unit 120 then calculates a plurality of forward regularized cumulative costs Cum according to the plurality of costs C generated by the cost calculating unit 110 and relative distances between the plurality of positions (step S220). In one embodiment, the cost calculating unit 110 may calculate the plurality of forward regularized cumulative Cum according to equation (2) below:

$$Cum(x, y) = C(x, y) + \min_{x'}\left(Cum(x', y') + \beta(x - x')^2\right) \quad (2)$$

In equation (2), Cum(x, y) is the forward regularized cumulative cost corresponding to the position P=(x, y) in the overlapping area OA, C(x, y) is the cost corresponding to the position P=(x, y) in the overlapping area OA, Cum(x', y') is the forward regularized cumulative cost corresponding to an adjacent position Pa=(x', y') of the position P=(x, y) in the overlapping area OA, $(x-x')^2$ is a square of a distance between the position P=(x, y) and the adjacent position Pa=(x', y') in the x direction, and β is a weighting.

Figure 6:
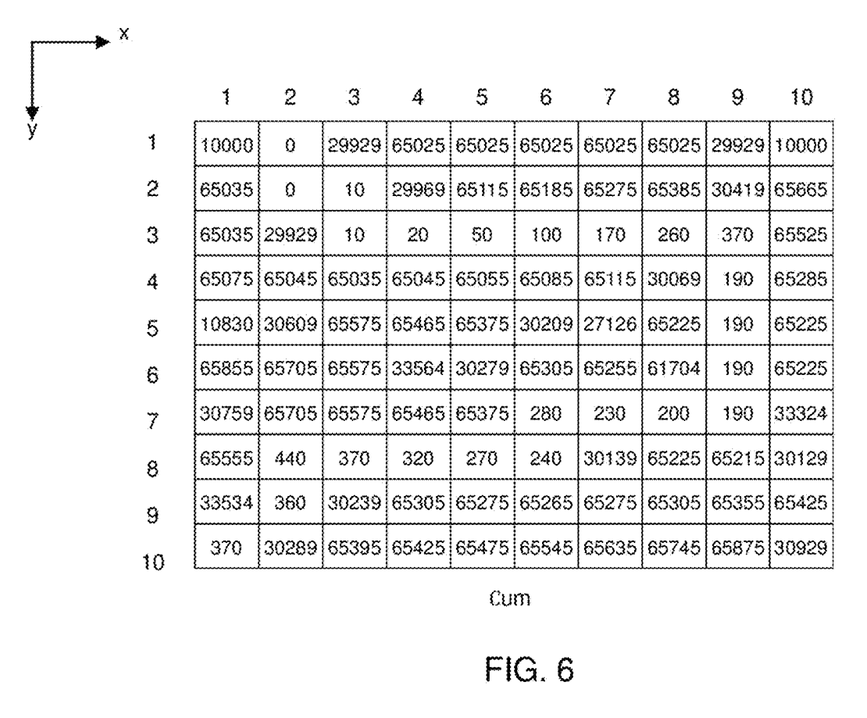
FIG. 6 shows a plurality of forward regularized cumulative costs.

In this embodiment, the adjacent position Pa=(x', y') of the position P=(x, y) is at a row above the position P=(x, y). Taking FIG. 5 for instance, x'=1 to 10, and y'=y−1. For example, in regard to a position P=(x, y)=(1, 1) at the first row in the overlapping area OA, because y'=1−1=0, there is no adjacent position, and so the weighting Cum(1, 1)=C(1, 1)=10000; similarly, for other positions at the first row in the overlapping area OA, Cum(2,1)=C(2,1)=0, . . . , and Cum(10,1)=C(10,1)=10000. In regard to a position P=(x, y)=(1, 2) at the second row in the overlapping area OA, because y'=2−1=1, the adjacent position Pa=(x',y')=(1,1), (2,1), . . . , and (10,1). Taking β=10 for instance, (Cum(1, 1)+β(1−1)²=10000+10×(1−1)²=10000; (Cum(2,1)+β(1−2)²=0+10×(1−2)²=10; and so forth. Further, among all of the adjacent positions Pa=(x',y')=(1, 1), (2, 1), . . . , and (10, 1), (Cum(x',y')+β(x−x')²)=10 of Pa=(x', y')=(2, 1) is the smallest, and thus Cum(1,2)=C(1,2)+10=65025+10=65035. Similarly, among the adjacent positions Pa=(x',y')=(1, 1), (2,1), . . . , and (10,1) of the position P=(x, y)=(2, 2), (Cum(x',y')+β(x−x')²)=Cum(2,1)+β(2−2)²=0+10×(2−2)²=0 of Pa=(x', y')=(2, 1) is the smallest, and so Cum(2,2)=C(2, 2)+0=0+0=0. Accordingly, as shown in FIG. 6, the cumulative cost calculating unit 120 may generate the plurality of forward regularized cumulative costs Cum respectively corresponding to the plurality of positions in the overlapping area OA. It is known from equation (2) that, in this embodiment, the forward regularized cumulative cost Cum has a spatial regularization term, i.e., $\beta(x-x')^2$ in other embodiments, the spatial regularization term may be replaced by β|x−x'|.

It should be noted that, the value of the above weighting β is associated with the spatial regularization term and the image quality, and may be preferably set according to Table-1. It should be noted that, Table-1 is an example rather than a limitation to the present invention, and the weighting β may be appropriately adjusted according to actual applications.

TABLE 1

| | | spatial regularization term | |
|---|---|---|---|
| Image quality | | $(x - x')^2$ | $\|x - x'\|$ |
| 8-bit | Grayscale | β ≈ 10 | β ≈ 5 |
| | Color | 10 ≤ β ≤ 30 | 5 ≤ β ≤ 15 |
| 10-bit | Grayscale | β ≈ 40 | β ≈ 20 |
| | Color | 40 ≤ β ≤ 120 | 20 ≤ β ≤ 60 |

Next, the seam determining unit 130 determines a seam in the overlapping area OA according to the plurality of forward regularized cumulative costs Cum (step S230). The seam includes a plurality of stitching positions $P_{SL}$.

Figure 7:
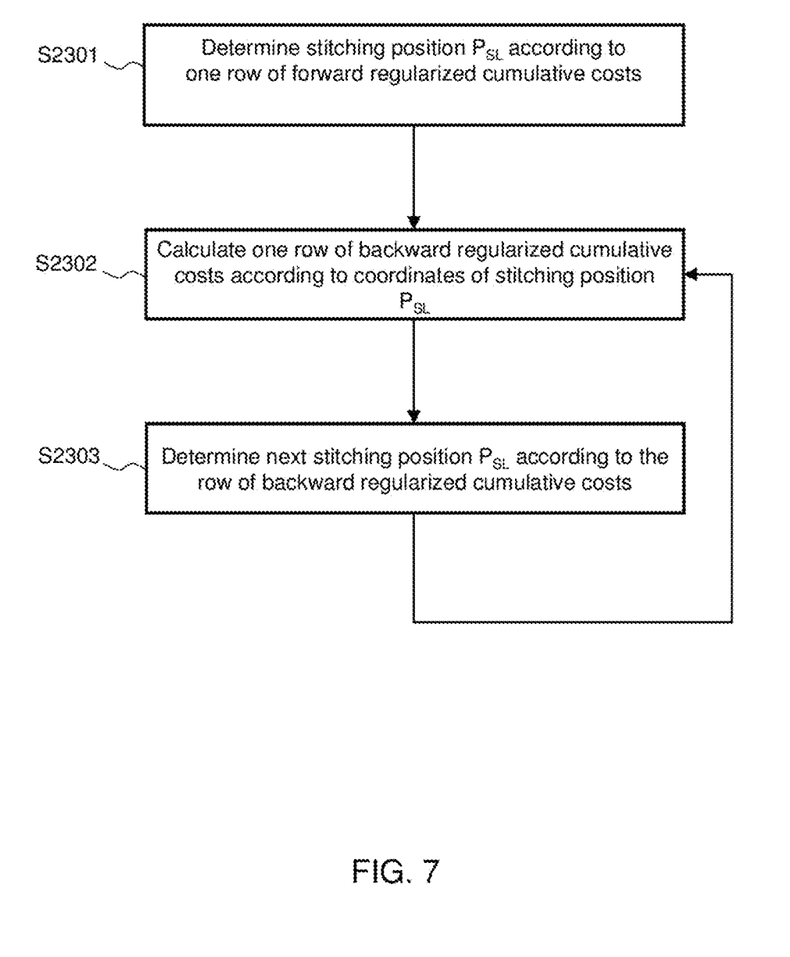
FIG. 7 is a detailed flowchart of step S230.

For example, FIG. 7 shows a detailed flowchart of step S230. The seam determining unit 130 determines a stitching position $P_{SL}$ according to one line of forward regularized cumulative costs Cum (step S2301). Taking FIG. 6 for instance, the seam determining unit 130 selects a smallest Cum(1, 10) from the one line (i.e., the tenth row) of the forward regularized cumulative costs Cum(1, 10), Cum(2, 10), . . . and Cum(10, 10), and selects a position P=(1, 10) corresponding to Cum(1, 10) as the tenth-row stitching position $P_{SL}=(x'', y'')=(1, 10)$.

The seam determining unit 130 then calculates one line of backward regularized cumulative costs Cumb according to the stitching position $P_{SL}$ (step S2302). In one embodiment, the seam determining unit 130 may calculate the backward regularized cumulative cost Cumb according to equation (3) below:

$$Cumb(x,y)=Cum(x,y)+\beta(x-x'')^2 \quad (3)$$

Figure 8:
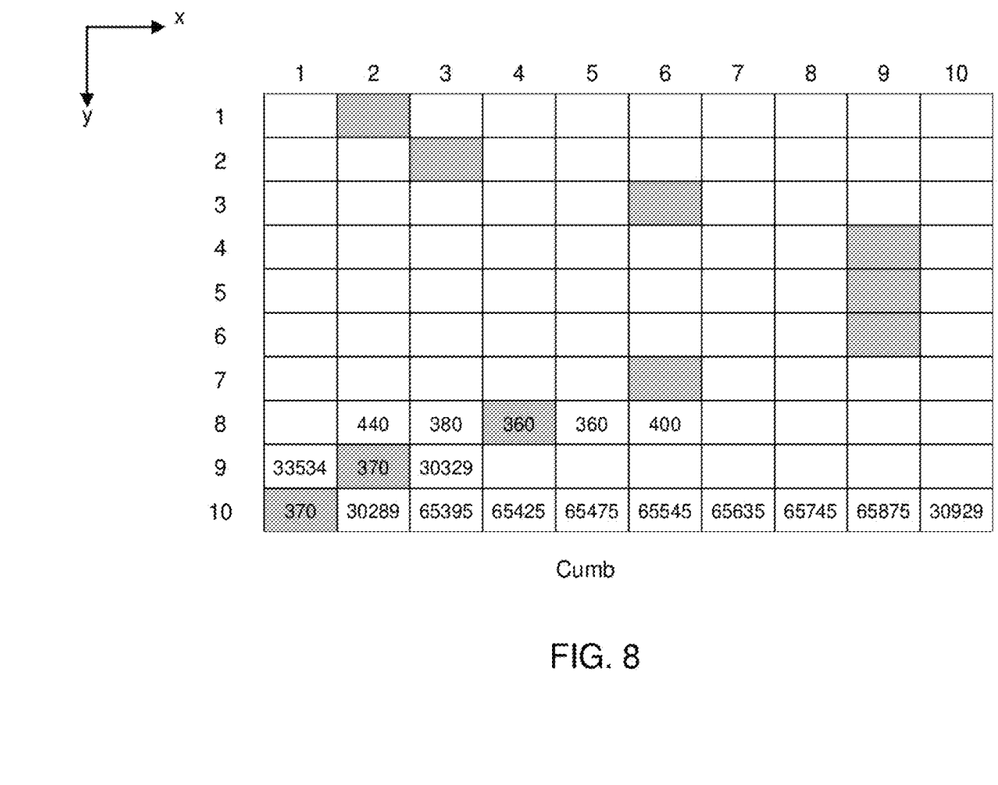
FIG. 8 shows a plurality of backward regularized cumulative costs.

In equation (3), Cumb(x, y) is the backward regularized cumulative cost corresponding to the position P=(x, y) in the overlapping area OA, Cum(x, y) is the forward regularized cumulative costs corresponding to the position P(x, y) in the overlapping area, $(x-x'')^2$ is a square of a distance between the position P(x, y) and the stitching position $P_{SL}=(x'', y'')$ in the x direction, and β is a weighting. Taking FIG. 6 for instance, the backward regularized cumulative cost Cumb of the ninth row may be determined according to the tenth-row stitching position $P_{SL}$. More specifically, for the tenth-row stitching position $P_{SL}=(x'', y'')=(1, 10)$, again taking β=10 for instance, according to equation (3), it is obtained that Cumb(1,9)=Cum(1, 9)+10*(1−1)²=33534+0=33534; Cumb (2, 9)=Cum(2, 9)+10*(2−1)²=360+10=370. Accordingly, the seam determining unit 130 may generate the backward regularized cumulative costs Cumb(x, 9), where x=1 to 10, as shown in FIG. 8. It is known from equation (3) that, in this embodiment, the backward regularized cumulative cost Cumb also has a spatial regularization item, i.e., β(x−x")²; in other embodiments, the spatial regularization item may be replaced by β|x−x"|.

Next, the seam determining unit 130 determines the next stitching position $P_{SL}$ according to the backward regularized cumulative cost Cumb of that line (step S2303). Taking FIG. 8 for instance, the seam determining unit 130 selects a smallest Cumb(2, 9) from the ninth-row backward regularized cumulative costs Cumb(1, 9), Cumb(2, 9), . . . and Cumb(10, 9), and selects a position P=(2, 9) correspond to Cumb(2, 9) as the ninth-row stitching position PSL=(x", y")=(2, 9). It should be noted that, if there are two or more smallest values in one row of backward regularized cumulative costs Cumb, the position corresponding to any of the smallest values may be selected as the stitching position $P_{SL}$ of that row.

Next, the seam determining unit 130 determines the eighth-row backward regularized cumulative cost Cumb according to the ninth-row stitching position (returning to step S2302), and then determines the eighth-row stitching position according to the backward regularized cumulative cost Cumb (step S2303). The above process is repeated until the stitching positions of all of the rows in the overlapping area OA have been determined.

Again referring to FIG. 1 and FIG. 2, after the seam determining unit 130 has completed step S230, the stitching unit 140 stitches the first image I1 and the second image I2 on the basis of the seam to generate a stitched image IS (step S240). Again taking FIG. 4 for instance, the stitched image IS is as shown in FIG. 9, wherein the first image I1 is the left-side image and the second image I2 is the right-side image, the pixels on the left side of the seam in the stitched image IS are from the first image I1 (parts shaded by horizontal lines), the pixels on the right side of the seam are from the second image I2 (parts shaded by vertical lines), and the pixels on the seam may be from the first image I1 or the second image I2 (parts shaded in gray).

Figure 9:
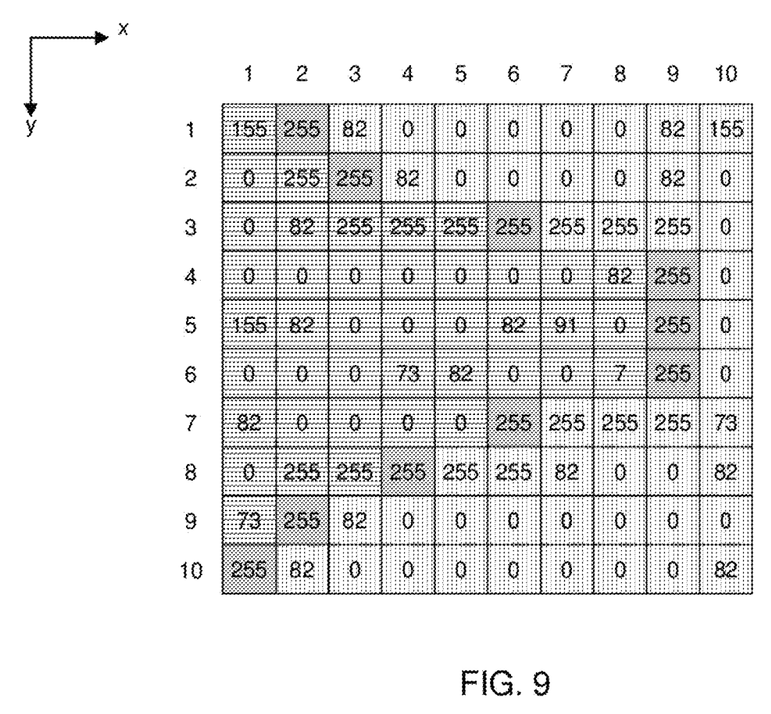
FIG. 9 shows a stitched image corresponding to an overlapping part.
Figure 13:
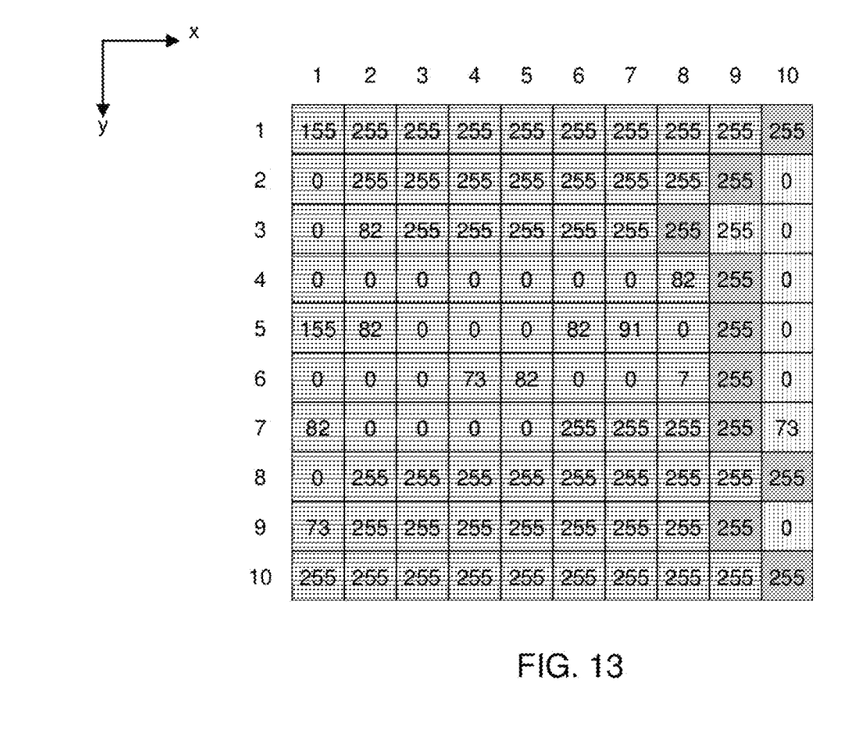
FIG. 13 is a stitched image obtained based on a conventional technology.

As shown in FIG. 9, the seam of the stitched image IS does not pass through the first object in the first image I1 and the second object in the second image I2, thus providing better stitched image quality, which is contributed by the spatial regularization item contained in the forward regularized cumulative cost Cum and the backward regularized cumulative cost Cumb in the present invention. In other words, the cost gets higher as the relative distance increases, and the foregoing spatial regularization item effectively resolves the issue of the lowered image quality of a stitched image of the prior art, in which relative distances between positions are not taken into account in a way that a seam passes through an object that then becomes misaligned in the stitched image, and hence the lowered image quality. As shown in FIG. 13, a stitched image obtained based on the prior art is depicted.

Figure 10:
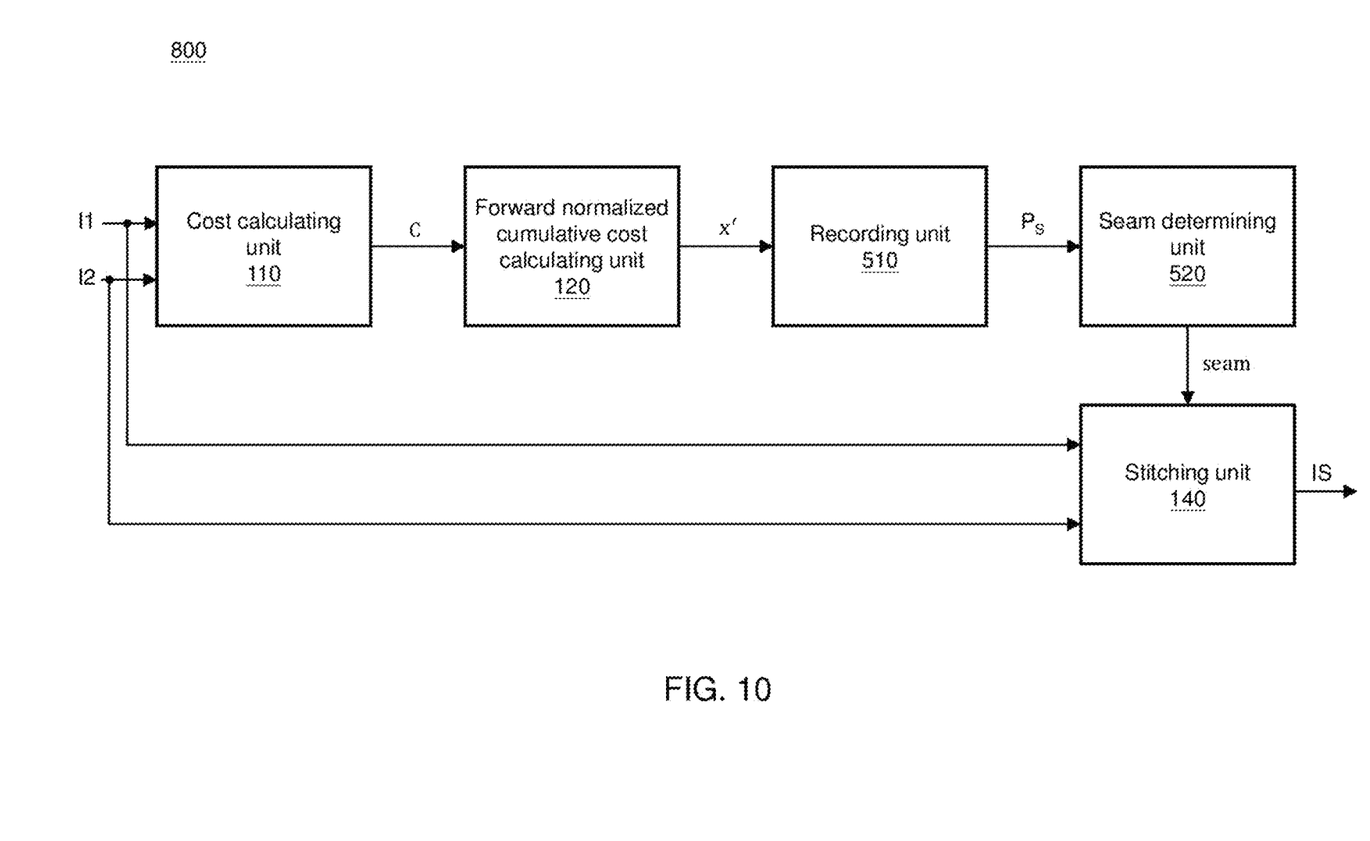
FIG. 10 is a function block diagram of an image stitching device according to another embodiment of the present invention.
Figure 11:
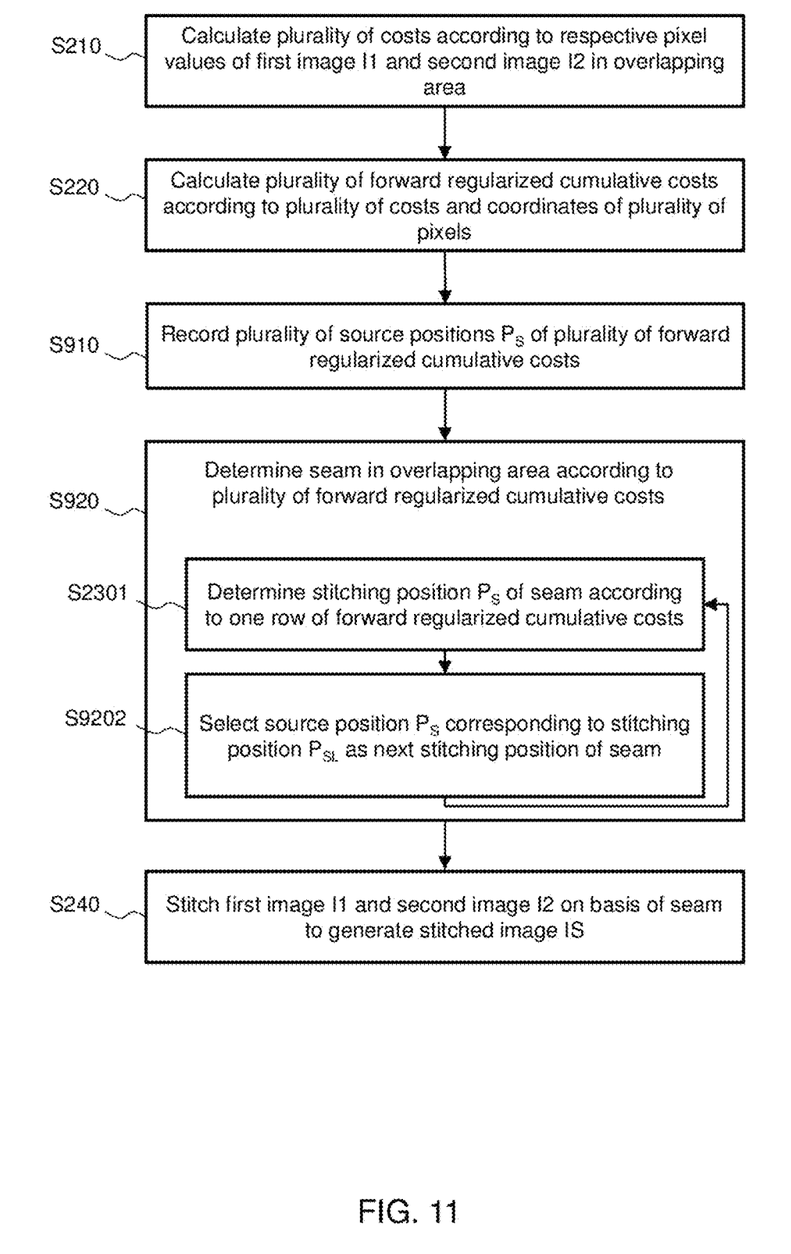
FIG. 11 is a flowchart of an image stitching method according to another embodiment of the present invention.

FIG. 10 shows a function block diagram of an image stitching device according to another embodiment of the present invention. The image stitching device 800 includes a cost calculating unit 110, a forward regularized cumulative cost calculating unit 120, a recording unit 510, a seam determining unit 520 and a stitching unit 140. FIG. 11 shows a flowchart of an image stitching method according to another embodiment of the present invention. The process in FIG. 11 corresponds to the device in FIG. 10. The cost calculating unit 110 and the forward regularized cumulative cost calculating unit 120 respectively perform steps S210 and S220, and associated details are described above and are omitted herein. It should be noted that, when the forward regularized cumulative cost calculating unit 120 calculates the plurality of forward regularized cumulative costs Cum according to equation (2), x' that causes (Cum(x',y')+β(x−x')²) in equation (2) to have a smallest value is outputted for every corresponding position. Next, the recording unit 510 records a plurality of source positions of the plurality of forward regularized cumulative costs according to x' corresponding to the plurality of forward regularized cumulative costs. How the recording unit 510 records a source position is given below.

Figure 12:
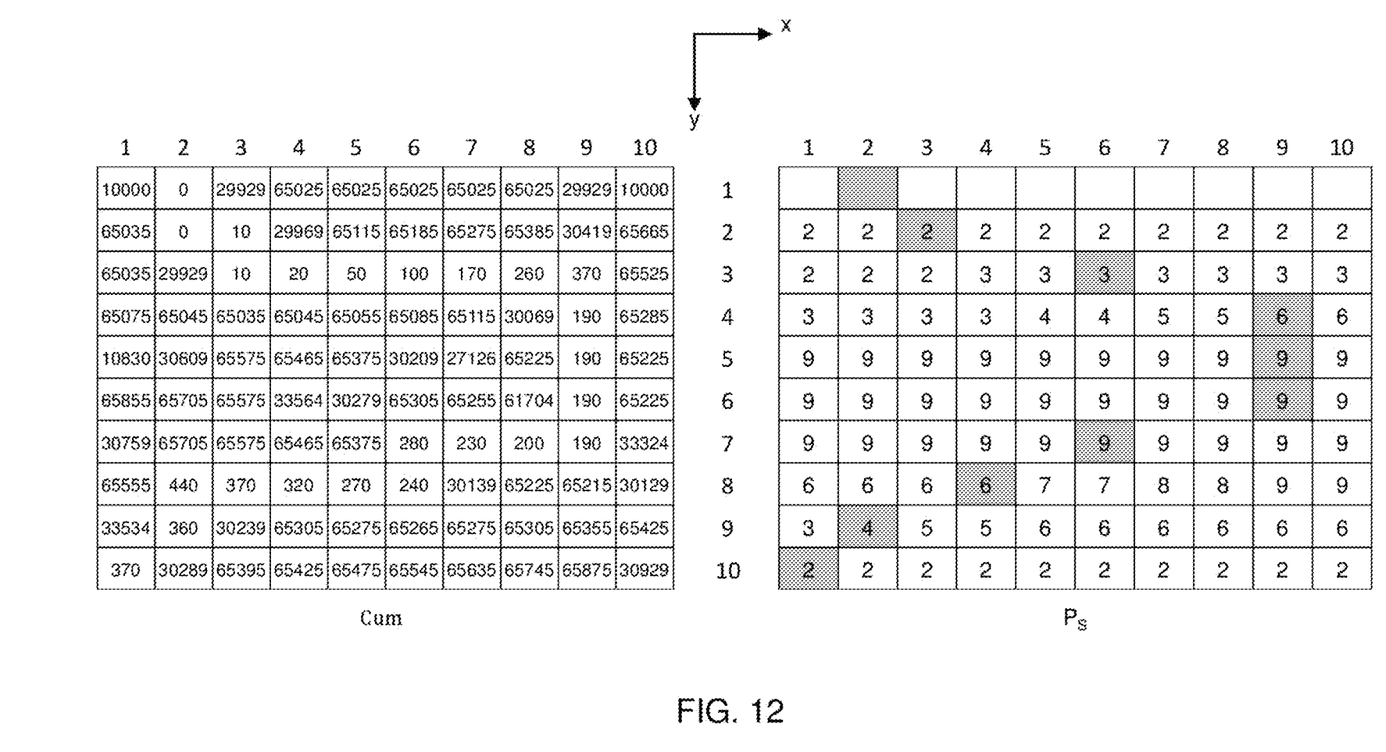
FIG. 12 shows a plurality of regularized cumulative costs and a plurality of corresponding source positions.

FIG. 12 shows a plurality of forward regularized cumulative costs Cum and a plurality of corresponding source positions Ps. Taking FIG. 5 for instance, for the first row in the overlapping area OA, the forward regularized cumulative costs Cum are directly duplicated from the plurality of costs C of the corresponding positions, and so they are no corresponding source positions Ps. For the second row in the overlapping area OA, taking forward regularized cumulative cost Cum(1, 2) for example, (Cum(x',y')+β(x−x')²) has a smallest value when x'=2, and so the source position of Cum(1, 2) is $P_S$=(2, 1), and the rest is similarly deduced. In practice, because the source position is necessarily from a previous line, the recording unit 510 is required to record only x' that causes (Cum(x',y')+β(x−x')²) to have the smallest value. Upon calculating one forward regularized cumulative cost Cum of one position according to equation (2), the forward regularized cumulative cost calculating unit 120 outputs x' corresponding to that position. Thus, when step S910 is completed, the recording unit 510 may generate the plurality of source positions Ps as shown on the right side of FIG. 12, wherein the source positions Ps respectively correspond to the plurality of positions in the overlapping area OA.

The seam determining unit 520 then determines a seam in the overlapping area according to the plurality of forward regularized cumulative costs (step S920). More specifically, this step includes sub-steps S2301 and S9202. Details of step S2301 are given in the description associated with FIG. 7, and are omitted herein. Taking FIG. 12 for instance, in step S2301, the seam determining unit 520 determines the tenth-row stitching position $P_{SL}$=(x", y")=(1, 10) according to the smallest value of the tenth-row Cum(1, 10). The seam determining unit 520 selects a source position corresponding to the stitching position as a next stitching pixel (step S9202). In the example in FIG. 12, according to the source position recorded by the recording unit 520, the x-coordinate of the source position $P_S$ of the stitching position $P_{SL}$=(1, 10) is 2 (i.e., x'=2). Thus, the seam determining unit 520 selects a next stitching position $P_{SL}$=(2, 9) in step S9202. The above process is repeated until the stitching positions of all the rows in the overlapping area OA have been determined. Taking FIG. 12 for instance, a seam consisting of the positions marked in gray is eventually obtained.

Next, the stitching unit 140 stitches the first image I1 and the second image I2 on the basis of the seam to generate a stitched image (step S240). Details of this step are given in the description associated with FIG. 2, and are omitted herein. Since the seam obtained by the stitch determining unit 520 in step S920 (as shown in FIG. 13) is identical to the seam (as shown in FIG. 8) obtained by the seam determining unit 130 of the previous embodiment, the stitched image obtained in this embodiment is also as shown in FIG. 9.

In the foregoing embodiments, "a line" may refer to, for example but not limited to, "a row"; in other embodiments, "a line" may refer to "a column".

While the invention has been described by way of example and in terms of the embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. An image stitching method, for stitching a first image and a second image, comprising:
    calculating, according to pixel values of the first image and the second image in an overlapping area, a plurality of costs respectively corresponding to a plurality of positions in the overlapping area;
    calculating, according to the plurality of costs and relative distances between the plurality of positions, a plurality of forward regularized cumulative costs respectively corresponding to the plurality of positions in the overlapping area;
    determining a seam in the overlapping area according to the plurality of forward regularized cumulative costs, wherein the seam comprises a plurality of stitching positions; and
    stitching the first image and the second image on the basis of the seam to generate a stitched image.

2. The image stitching method according to claim 1, wherein a forward regularized cumulative cost of the plurality of forward regularized cumulative costs of a position is associated with a distance component between the position and an adjacent position.

3. The image stitching method according to claim 1, wherein the step of determining the seam in the overlapping area according to the plurality of forward regularized cumulative costs comprises:
    determining a stitching position of the seam according to one line of forward regularized cumulative costs;
    calculating one line of backward regularized cumulative costs according to the stitching position;
    determining a smallest backward regularized cumulative cost from the line of backward regularized cumulative costs; and
    selecting a position corresponding to the smallest backward regularized cumulative cost as a next stitching position of the seam.

4. The image stitching method according to claim 1, further comprising:
    recording a plurality of source positions of the plurality of forward regularized cumulative costs.

5. The image stitching method according to claim 2, wherein the forward regularized cumulative cost of the position comprises a square of the distance component between the position and the adjacent position.

6. The image stitching method according to claim 2, wherein the forward regularized cumulative cost of the position comprises an absolute value of the distance component between the position and the adjacent position.

7. The image stitching method according to claim 4, wherein the step of determining the seam in the overlapping area according to the plurality of forward regularized cumulative costs comprises:
    determining a stitching position of the seam according to one line of forward regularized cumulative costs; and
    selecting a source position corresponding to the stitching position as a next stitching position of the seam.

8. An image stitching device, for stitching a first image and a second image, comprising:
    a cost calculating unit, calculating, according to pixel values of the first image and the second image in an overlapping area, a plurality of costs respectively corresponding to a plurality of positions in the overlapping area;
    a forward regularized cumulative cost calculating unit, calculating, according to the plurality of costs and relative distances between the plurality of positions, a plurality of forward regularized cumulative costs respectively corresponding to the plurality of positions in the overlapping area;
    a seam determining unit, determining a seam in the overlapping area according to the plurality of forward regularized cumulative costs; and
    a stitching unit, stitching the first image and the second image on the basis of the seam to generate a stitched image.

9. The image stitching device according to claim 8, wherein a forward regularized cumulative cost of the plurality of forward regularized cumulative costs of a position is associated with a distance component between the position and an adjacent position.

10. The image stitching device according to claim 8, wherein the seam determining unit determines the seam in the overlapping area according to the plurality of forward regularized cumulative costs by:
    determining a stitching position of the seam according to one line of forward regularized cumulative costs;
    calculating one line of backward regularized cumulative costs according to the stitching position;
    determining a smallest backward regularized cumulative cost from the line of backward regularized cumulative costs; and
    selecting a position corresponding to the smallest backward regularized cumulative cost as a next stitching position of the seam.

11. The image stitching device according to claim 8, further comprising:
    a recording unit, recording a plurality of source positions of the plurality of forward regularized cumulative costs.

12. The image stitching device according to claim 9, wherein the forward regularized cumulative cost of the position comprises a square of the distance component between the position and the adjacent position.

13. The image stitching device according to claim 9, wherein the forward regularized cumulative cost of the position comprises an absolute value of the distance component between the position and the adjacent position.

14. The image stitching device according to claim 11, wherein the seam determining unit determines the seam in the overlapping area according to the plurality of forward regularized cumulative costs by:
    determining a stitching position of the seam according to one line of forward regularized cumulative costs; and
    selecting a source position corresponding to the stitching position as a next stitching position of the seam.

* * * * *